US012183985B2

(12) United States Patent
Jervis

(10) Patent No.: US 12,183,985 B2
(45) Date of Patent: Dec. 31, 2024

(54) LOW-LOSS SWITCHABLE PANEL ANTENNAS

(71) Applicant: Ruckus IP Holdings LLC, Claremont, NC (US)

(72) Inventor: James W. Jervis, Santa Clara, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 4 days.

(21) Appl. No.: 18/071,681

(22) Filed: Nov. 30, 2022

(65) Prior Publication Data

US 2023/0178888 A1 Jun. 8, 2023

Related U.S. Application Data

(60) Provisional application No. 63/285,165, filed on Dec. 2, 2021.

(51) Int. Cl.
*H01Q 3/24* (2006.01)

(52) U.S. Cl.
CPC .................................. *H01Q 3/247* (2013.01)

(58) Field of Classification Search
CPC ................................................. H01Q 21/0025
See application file for complete search history.

(56) References Cited

U.S. PATENT DOCUMENTS

2020/0176868 A1* 6/2020 Feilen .................. H01Q 25/002
2020/0411981 A1* 12/2020 Kimball .................. H04B 1/44
2021/0075449 A1* 3/2021 Lee .......................... H03F 3/24

* cited by examiner

*Primary Examiner* — Ricardo I Magallanes
*Assistant Examiner* — Aladdin Abdulbaki
(74) *Attorney, Agent, or Firm* — Myers Bigel, P.A.

(57) ABSTRACT

A switchable antenna comprises an RF port, an antenna array that includes at least a first column of radiating elements, a second column of radiating elements and a third column of radiating elements, and a feed network coupled between the RF port and the antenna array. The feed network includes a first switch having a first output that is coupled to each of the columns of radiating elements and a second output and a second switch having a first input coupled to the first output of the first switch and a second input coupled to the second output of the first switch, and a first output coupled to the second column of radiating elements.

19 Claims, 5 Drawing Sheets

LOW-LOSS SWITCHABLE PANEL ANTENNAS

CROSS-REFERENCE TO RELATED APPLICATION

The present application claims priority under 35 U.S.C. § 119 to U.S. Provisional Patent Application Ser. No. 63/285,165, filed Dec. 2, 2021, the entire content of which is incorporated herein by reference as if set forth in its entirety.

BACKGROUND

The present invention generally relates to radio communications and, more particularly, to antennas that have adjustable radiation patterns.

Wireless communications systems such as, for example, cellular communications systems and wireless local area networks ("WLANs"), are well known in the art. In a cellular communications system, a geographic area is divided into a series of regions that are referred to as "cells" that are served by respective base stations. Each base station may include baseband equipment, radios and one or more base station antennas that are configured to provide two-way radio frequency ("RF") communications with fixed and mobile subscribers ("users") that are positioned throughout the cell. Most base station antennas are so-called "panel" antennas that include one or more columns of radiating elements that are mounted to extend forwardly from a reflector panel.

A WLAN refers to a network that operates in a limited area (e.g., within a home, store, campus, etc.) that wirelessly interconnects client devices (e.g., smartphones, computers, printers, etc.) with each other and/or with external networks such as the Internet. Most WLANs operate under the IEEE 802.11 standards, and such WLANs are commonly referred to as WiFi networks. A WiFi network includes one or more radio nodes or "access points" that are installed throughout a coverage area. Each access point comprises one or more radios and associated antennas. Client devices communicate with each other and/or with wired devices that are connected to the WiFi network through the access points. The access points may be connected to each other and/or to gateways that may be used to provide Internet access to the client devices. Most indoor access points include integrated antennas. However, access points that are deployed in large venues or that provide outdoor coverage often operate more akin to cellular base station antennas and include a separate panel antenna.

Base station antennas and panel WiFi antennas typically include phase-controlled arrays of radiating elements or "antenna arrays." The radiating elements in an antenna array typically extend forwardly from a reflector panel, and are arranged in one or more vertically-extending columns when the antenna is mounted for use. RF signals output from a radio are divided into a plurality of sub-components that are fed to the individual radiating elements in the antenna array (or to groups thereof that are referred to as sub-arrays). The radiating elements generate a radiation pattern or "antenna beam" in response to the RF signal. Most base station antennas and panel WiFi antennas are "sector" antennas that include antenna arrays that are configured to generate directional radiation patterns that have high antenna gain in some directions and lower antenna gain in other directions. The radiation patterns generated by the antenna arrays of a sector antenna are designed to provide coverage to a pre-defined portion of a cell that is referred to as a "sector." In one common configuration, a hexagonally-shaped cell is divided into three 120° sectors in the "azimuth" plane that are served by respective sector antennas. The azimuth plane refers to a horizontal plane (i.e., a plane that is parallel to the plane defined by the horizon) that bisects the antenna. The antenna arrays are designed to generate antenna beams having suitable Half Power Beamwidths (HPBW) in the azimuth plane to provide coverage to the sector (e.g., the antenna beam may have an azimuth HPBW of approximately 65°, which generally results in good coverage for a 120° sector). Reference will also be made herein to the elevation plane, which is a plane extending along a boresight pointing direction of one of the antenna arrays that is perpendicular to the azimuth plane. The boresight pointing direction of an antenna array refers to the direction where the gain of the antenna beam generated by the antenna array is the highest.

SUMMARY

Pursuant to embodiments of the present invention, switchable antennas are provided that comprise an RF port, an antenna array that includes at least a first column of radiating elements, a second column of radiating elements and a third column of radiating elements, and a feed network coupled between the RF port and the antenna array. The feed network includes a first switch having a first output that is coupled to each of the columns of radiating elements and a second output and a second switch having a first input coupled to the first output of the first switch and a second input coupled to the second output of the first switch, and a first output coupled to the second column of radiating elements.

In some embodiments, the feed network further may comprise a power divider that has an input that is coupled to the first output of the first switch, the power divider including at least a first output that is coupled to the first column of radiating elements, a second output that is coupled to the second column of radiating elements via the second switch, and a third output that is coupled to the third column of radiating elements.

In some embodiments, the second column of radiating elements may be in between the first column of radiating elements and the third column of radiating elements.

In some embodiments, the antenna array may include a total of three columns of radiating elements, and wherein the power divider comprises a 1×3 power divider. The 1×3 power divider may be an unequal power divider that routes a greater percentage of the RF energy input thereto to the second output than it routes to either the first output or the third output. In other embodiments, pattern shaping elements may be positioned adjacent at least some of the radiating elements in both the first column of radiating elements and the third column of radiating elements, where the pattern shaping elements configured to increase the amount of RF energy emitted by both the first column of radiating elements and the third column of radiating elements toward a center of a coverage area for the antenna array. In still other embodiments, the switchable antenna may instead include a first impedance mismatch coupled to the first output of the power divider and a second impedance mismatch coupled to the third output of the power divider, wherein the first and second impedance mismatches have equal but opposite imaginary components.

In some embodiments, the second output of the first switch may be coupled to the second input of the second switch via a coaxial cable. In some embodiments, at least one of the first switch and the second switch may be a field effect transistor, a pin diode or a single pole double throw switch.

Pursuant to further embodiments of the present invention, switchable antennas are provided that are switchable between a high gain mode and a lower gain mode. These antennas include an RF port, an antenna array that includes at least a first column of radiating elements, a second column of radiating elements and a third column of radiating elements, a first switch having an input coupled to the RF input port, and a second switch having an output coupled to the second column of radiating elements. The second column of radiating elements is coupled to the RF input port via a greater number of switches than the first and third columns of radiating elements.

The second column of radiating elements may be positioned in between the first column of radiating elements and the third column of radiating elements. In some embodiments, both first and second outputs of the first switch may be coupled to the second column of radiating elements through the second switch. A power divider may be interposed between the first output of the first switch and the second switch. The power divider may include at least first through third outputs, and the first output of the power divider may be coupled to the first column of radiating elements, the third output of the power divider may be coupled to the third column of radiating elements, and the second output of the power divider may be coupled to the second column of radiating elements through the second switch. The second output of the power divider may be coupled to a first input of the second switch and the second output of the first switch may be coupled to a second input of the second switch (e.g., via an RF transmission line). In some embodiments, the antenna array may include a total of three columns of radiating elements, and the power divider may be a 1×3 power divider.

In some embodiments, the 1×3 power divider may be an unequal power divider. In other embodiments, pattern shaping elements may be positioned adjacent at least some of the radiating elements in both the first column of radiating elements and the third column of radiating elements, where the pattern shaping elements configured to increase the amount of RF energy emitted by both the first column of radiating elements and the third column of radiating elements toward a center of a coverage area for the antenna array. In still other embodiments, the switchable antenna further comprises a first impedance mismatch coupled to the first output of the power divider and a second impedance mismatch coupled to the third output of the power divider, where the first and second impedance mismatches have equal but opposite imaginary components.

Pursuant to still further embodiments of the present invention, switchable antennas are provided that are switchable between a high gain mode and a lower gain mode. These antennas comprise an RF port, an antenna array that includes at least a first column of radiating elements, a second column of radiating elements and a third column of radiating elements, and a feed network that has a first loss when the antenna is configured to operate in the high gain mode and a second loss when the antenna is configured to operate in the lower gain mode, where the second loss exceeds the first loss.

The second column of radiating elements may be positioned in between the first column of radiating elements and the third column of radiating elements. In some embodiments, the feed network includes a first switch having an input coupled to the RF input port and a second switch having an output coupled to the second column of radiating elements, wherein the second column of radiating elements is coupled to the RF input port via both the first and second switches while the first and third columns of radiating elements are each coupled to the RF input port via only the first switch. In some embodiments, both first and second outputs of the first switch are coupled to the second column of radiating elements through the second switch. In some embodiments, a power divider is interposed between the first output of the first switch and the second switch. The power divider may include at least first through third outputs, and the first output of the power divider is coupled to the first column of radiating elements, the third output of the power divider is coupled to the third column of radiating elements, and the second output of the power divider is coupled to the second column of radiating elements through the second switch. The second output of the power divider may be coupled to a first input of the second switch and the second output of the first switch is coupled to a second input of the second switch.

BRIEF DESCRIPTION OF THE DRAWINGS

Like reference numerals refer to corresponding parts throughout the drawings. Moreover, multiple instances of the same part may be designated by a common prefix separated from an instance number by a dash.

DETAILED DESCRIPTION

While most sector antennas are designed to provide coverage to 90° or 120° sectors in the azimuth plane, there are some applications where narrower coverage areas are desirable. For example, in cellular communications systems, antennas having antenna arrays that generate antenna beams having azimuth HPBWs that are much narrower than 65° are often used to provide coverage to bridges, tunnels or long straight stretches of highway. Since the antenna beams are narrower (i.e., since the RF energy is concentrated into a smaller area), these antennas have higher gain and hence the number of base stations required to provide coverage along the bridge, tunnel or highway may be reduced. In large venue and outdoor WiFi applications, the "cells" may be sub-divided into more than three sectors (e.g., six, nine or twelve sectors), and thus the antenna arrays in these WiFi antennas should likewise be configured to produce antenna beams having much narrower azimuth beamwidths. In order to generate antenna beams having narrower azimuth beamwidths, antenna arrays are provided that include multiple columns of radiating elements that are all coupled to the same radio port, as the use of multiple columns increases the size or "aperture" of the antenna in the azimuth plane, which in turn acts to narrow the beamwidth of the generated antenna beams in the azimuth plane. The narrower antenna beams generated by these antenna arrays again have higher gain, and hence can provide coverage at greater distances from the antenna. Herein, antennas having antenna arrays that are configured to generate antenna beams having wider azimuth HPBWs that are designed to provide coverage to a relatively large sector (a sector spanning about 90° or more in the azimuth plane) are referred to as "sector antennas," and the resultant antenna beams are referred to as "sector antenna beams." Antennas having antenna arrays that are configured to generate antenna beams having much narrower azimuth HPBWs are referred to herein as "high gain antennas" and the resultant antenna beams are referred to as "high gain antenna beams."

Figure 1:
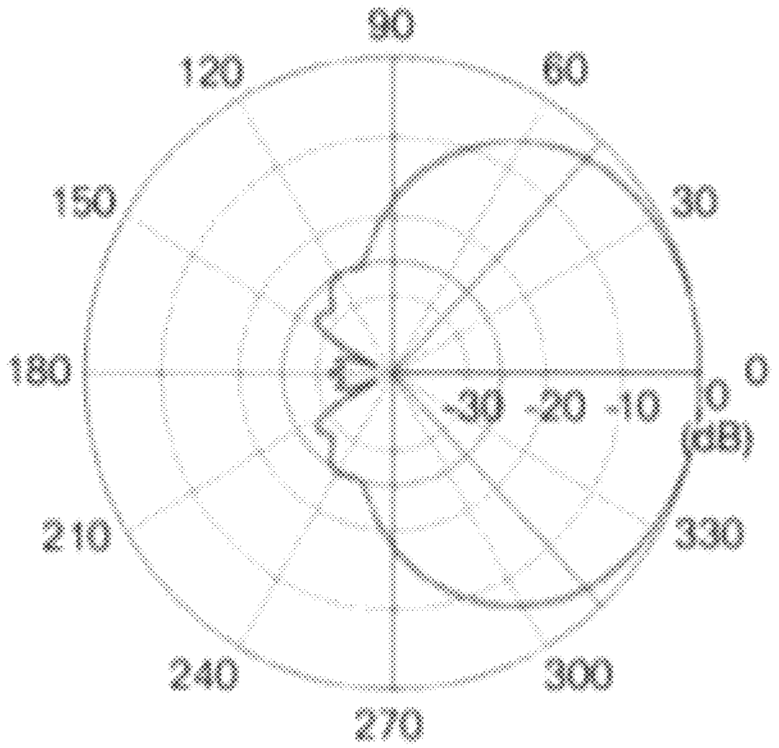
FIG. 1 is an azimuth plot of a typical 90° sector antenna beam.
Figure 2:
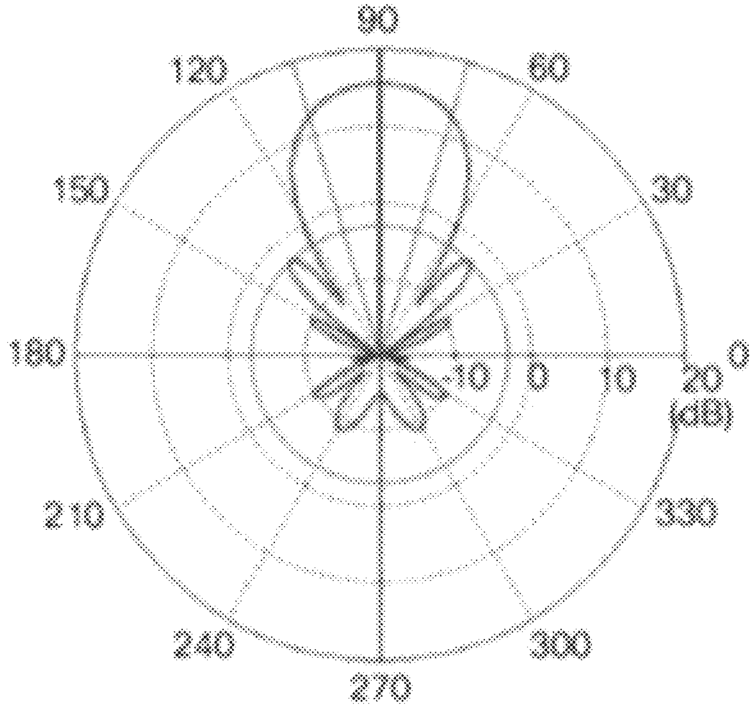
FIG. 2 is an azimuth plot of a typical high gain antenna beam.

FIGS. 1 and 2 are so-called azimuth plots that respectively illustrate a typical 90° sector antenna beam and a typical high gain antenna beam. Antenna beams are three-dimensional radiation patterns. An azimuth plot refers to a horizontal cross-section taken through the three-dimensional radiation pattern at the elevation angle where the gain of the antenna beam is a maximum. Thus, an azimuth plot illustrates the gain of the antenna beams as a function of angle from the boresight pointing direction of the antenna for the elevation angle where the gain of the antenna beam is at a maximum.

As shown in FIG. 1, the sector antenna beam has a wide azimuth beamwidth, providing almost constant gain over the range of −/+30° in the azimuth plane. The gain falls by about 3 dB from peak gain at about −/+45°, and drops off rapidly at azimuth angles exceeding −/+60°. These characteristics allow the antenna beam to provide good coverage throughout most of a 90° sector (with gain, and hence performance, reduced some at the outer edges of the sector), while reducing the extent to which the antenna beam emits radiation into neighboring sectors, where such radiation will appear as interference.

As shown in FIG. 2, the high gain antenna beam has an azimuth HPBW of about 30°, and hence will provide good coverage in a 60° sector. Moreover, the gain drops off more quickly (as compared to the sector antenna beam) beyond azimuth angles exceeding −/+30°, which further reduces the extent to which the antenna beam emits radiation into neighboring coverage areas.

Figure 3:
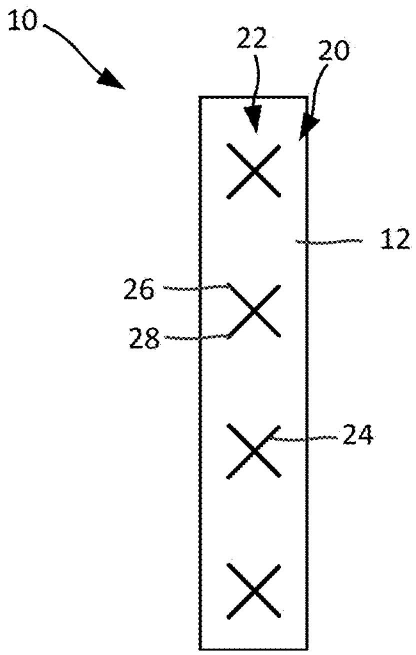
FIG. 3 is a schematic front view of a panel antenna that can generate the antenna beam shown in FIG. 1.

FIG. 3 is a schematic front view of a panel antenna 10 that can generate the antenna beam shown in FIG. 1. As shown in FIG. 3, the antenna 10 includes an antenna array 20 that comprises a single vertically-extending column 22 of radiating elements 24. The radiating elements 24 are mounted to extend forwardly from a reflector 12. A wide variety of different types of radiating elements 24 may be used including, for example, dipole, patch, monopole, horn and slot radiating elements, to name a few, or specific implementations of such radiating elements such as yagi or log periodic dipole radiating elements. The radiating elements 24 may comprise single polarization radiating elements that include a single radiator that emits radiation at a given polarization, or may comprise dual-polarized radiating elements that include first and second radiators that emit radiation at orthogonal polarizations. When dual-polarized radiating elements 24 are used, the antenna array 20 may be connected to a pair of radios, and will generate a pair of antenna beams, namely one at each polarization. Since the polarizations are orthogonal, they exhibit low-levels of cross-interference, and hence in some cases the use of dual-polarized radiating elements 24 may allow nearly a doubling in the capacity supported by the antenna. In other cases, the radio may instead simply transmit and receive RF signals through whichever polarization radiators provide better performance. In the example of FIG. 3, the radiating elements are illustrated as being slant −/+45° cross-dipole radiating elements 24 that each include a first dipole radiator 26 that emits radiating having a slant −45° polarization and a second dipole radiator 28 that emits radiating having a slant +45° polarization.

Each radiating element 24 may be designed to generate an individual or "element" radiation pattern having HPBWs of about 45° in both the azimuth and elevation planes. Since all of the radiating elements 24 are aligned in a vertically-extending column, the azimuth HPBW of the antenna beam generated by the antenna array 20 will be equal to the element radiation pattern. Thus, the azimuth HPBW of antenna array 20 will be about 45°, which will provide good coverage throughout the 90° sector. Since multiple radiating elements 24 are included in antenna array 20, the "aperture" of the array is increased in the elevation plane. By properly adjusting the phase of the sub-components of the RF signal that are fed to the individual radiating elements 24, this increased aperture in the elevation plane may be used to concentrate the RF energy in the elevation plane into a smaller area (so that the resultant antenna beam will have an elevation HPBW of less than 45°), thereby increasing the gain of the antenna beam. The more radiating elements 24 added to column 22 (where the radiating elements 24 are spaced apart from each other by a distance that is selected to control other parameters of the radiation pattern, such as off-axis grating lobes), the more the elevation HPBW is reduced, and the higher the gain of the antenna beam.

Figure 4:
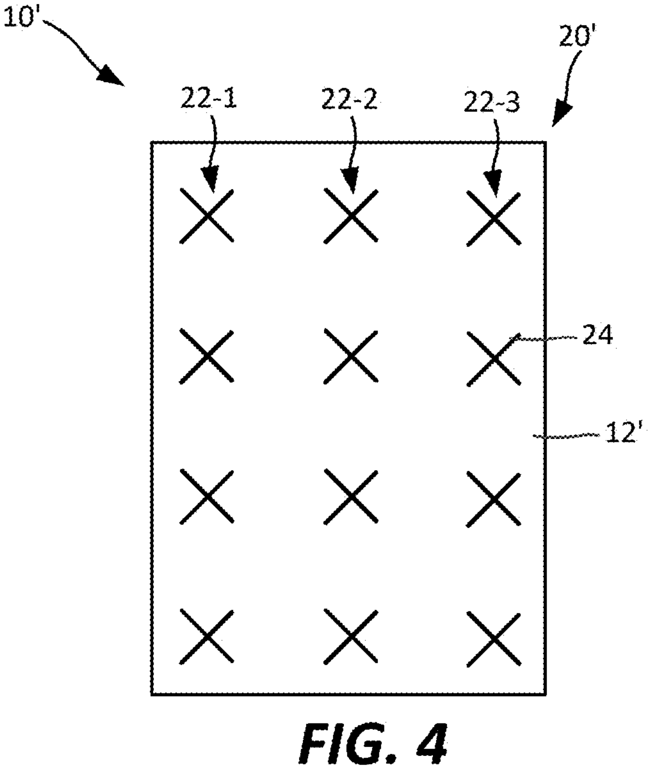
FIG. 4 is a schematic front view of a panel antenna that can generate the antenna beam shown in FIG. 2.

FIG. 4 is a schematic front view of a panel antenna 10' that can generate the antenna beam shown in FIG. 2. As shown in FIG. 4, the antenna 10' includes an antenna array 20' that includes three columns 22-1, 22-2, 22-3 of radiating elements 24. The radiating elements 24 are mounted to extend forwardly from a reflector 12'. In FIG. 4, the radiating elements 24 are schematically shown as being cross dipole radiating elements, although any type of radiating element may be used. Each radiating element 24 may be designed to generate an element radiation pattern having HPBWs of about 45° in both the azimuth and elevation planes. Since each column 22 includes multiple radiating elements 24, the "aperture" of antenna array 20' is increased in the elevation plane in the exact same manner as antenna array 20 of FIG. 3. Moreover, all three columns 22-1, 22-2, 22-3 are coupled to the same radio, and hence the aperture of the array is also increased in the azimuth plane as compared to antenna array 20 of FIG. 3. By properly adjusting the phase of the sub-components of the RF signal that are fed to the individual radiating elements 24 in all three columns 22, the RF energy emitted by antenna array 20' may be concentrated in both the azimuth and elevation planes, significantly increasing the gain of the resultant antenna beam. The gain can be further increased by increasing the number of columns 22 of radiating elements 24 and/or by increasing the number of radiating elements 24 included in each column 22.

Conventionally, antenna manufacturers provide a first antenna having the design of FIG. 3 to provide a sector antenna and provide a second antenna having the design of FIG. 4 to provide a high gain antenna. Pursuant to embodiments of the present invention, switchable antennas are provided that may operate either as a sector antenna or as a high gain antenna. The switchable antennas according to embodiments of the present invention may be configured, for example, at the factory or on-site at the time of installation, to operate as either a sector antenna or a high gain antenna. One problem with including switching capabilities in an antenna is that switching networks include losses. These losses reduce the gain of the antenna. The switchable antennas according to embodiments of the present invention can switch between a high gain mode and a lower gain mode with low loss.

The switchable antennas according to embodiments of the present invention include a feed network that couples at least one RF connector port to an antenna array. In some embodiments, the feed network may include a pair of switches that are connected back-to-back so that the first switch has an input and at least two outputs and the second switch has at least two inputs and a single output. A first output of the first switch may be coupled to each of the columns of radiating elements in the antenna array via a 1×N power divider, where N corresponds to the number of columns in the antenna array. Some of the outputs of the 1×N power divider may be coupled to respective columns in the antenna array without passing through any additional switches. However, at least one of the outputs of the 1×N power divider is coupled to a central column of the antenna array through a second switch by coupling the first output of the first switch to a first input of the second switch. Moreover, the second output of the first switch is also coupled to a second input of the second switch, and the output of the second switch is coupled to the central column of the antenna array.

With this arrangement, when the first switch is set to couple RF energy to the first output thereof, the RF energy is passed to the 1×N power divider where it is split and then the N sub-components of the RF signal are passed to the respective N columns of the antenna array. In this mode, the antenna operates as a lower gain sector antenna. When the first switch is set to couple RF energy to the second output thereof, all of the RF energy is passed through the second switch to one or more central columns of the antenna array. In this mode, the antenna operates a high gain antenna.

Each switch may introduce about 0.5 dB to about 1 dB of insertion loss, depending on the type of switch used. Notably, when the antenna operates as a high gain antenna, only the sub-components of the RF signal that are passed to the central column(s) of the antenna array pass through two switches. Thus, for example, assuming a three column antenna array, a 0.75 dB loss per switch, and equal power feeding of the three columns, the total loss added by the switch network is about 1.0 dB when the antenna operates as a high gain antenna, since the second switch only adds loss to one of the three columns of radiating elements. In contrast, when the antenna operates as a sector antenna, the loss will be about 1.5 dB since all of the RF energy flows through both switches. However, the loss added by the second switch is less critical when the antenna is operated as a sector antenna.

Thus, the antennas according to embodiments of the present invention may be switchable between a high gain mode and a lower gain (sector) mode, yet have relatively small switching losses. This may allow an antenna manufacturer to stock a single panel antenna that can be used in first and second modes that are associated with first and second applications.

The switchable antennas according to embodiments of the present invention may be switchable between a high gain mode and a lower gain mode. These antennas may include an RF port, an antenna array that includes at least a first column of radiating elements, a second column of radiating elements and a third column of radiating elements, and a feed network coupled between the RF port and the antenna array. In some embodiments, the feed network may include a first switch having a first output that is coupled to each of the columns of radiating elements and a second output and a second switch having a first input coupled to the first output of the first switch and a second input coupled to the second output of the first switch, and a first output coupled to the second column of radiating elements. In other embodiments, the first switch may have an input coupled to the RF input port, and the second switch may have an output coupled to the second column of radiating elements. In such embodiments, the second column of radiating elements may be coupled to the RF input port via a greater number of switches than the first and third columns of radiating elements. In still other embodiments, the feed network may be configured to have a first loss when the antenna is configured to operate in the high gain mode and a second loss when the antenna is configured to operate in the lower gain mode, where the second loss exceeds the first loss.

In any of the above embodiments, both the first and second outputs of the first switch may be coupled to the second column of radiating elements through the second switch. Additionally, a power divider may be interposed between the first output of the first switch and the second switch. The power divider may include at least first through third outputs, and the first output of the power divider may be coupled to the first column of radiating elements, the third output of the power divider may be coupled to the third column of radiating elements, and the second output of the power divider may be coupled to the second column of radiating elements through the second switch. In some embodiments, the second output of the power divider is coupled to a first input of the second switch and the second output of the first switch is coupled to a second input of the second switch. The second column of radiating elements may be positioned in between the first column of radiating elements and the third column of radiating elements.

Figure 5A:
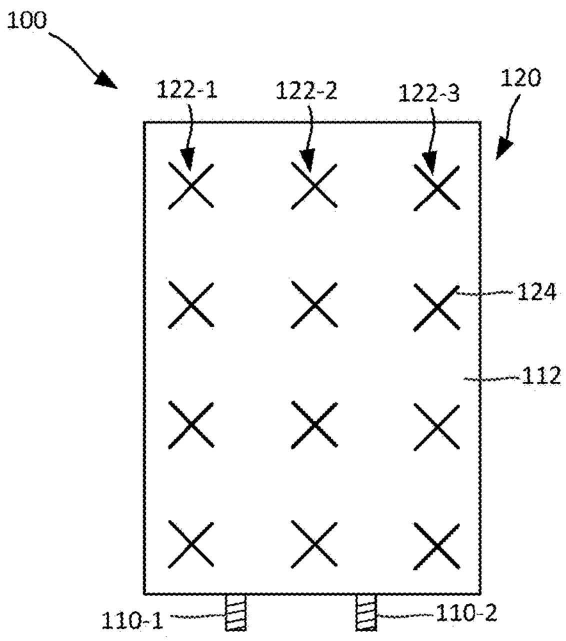
FIG. 5A is a schematic front view of a switchable antenna according to embodiments of the present invention with the radome thereof removed.
Figure 5B:
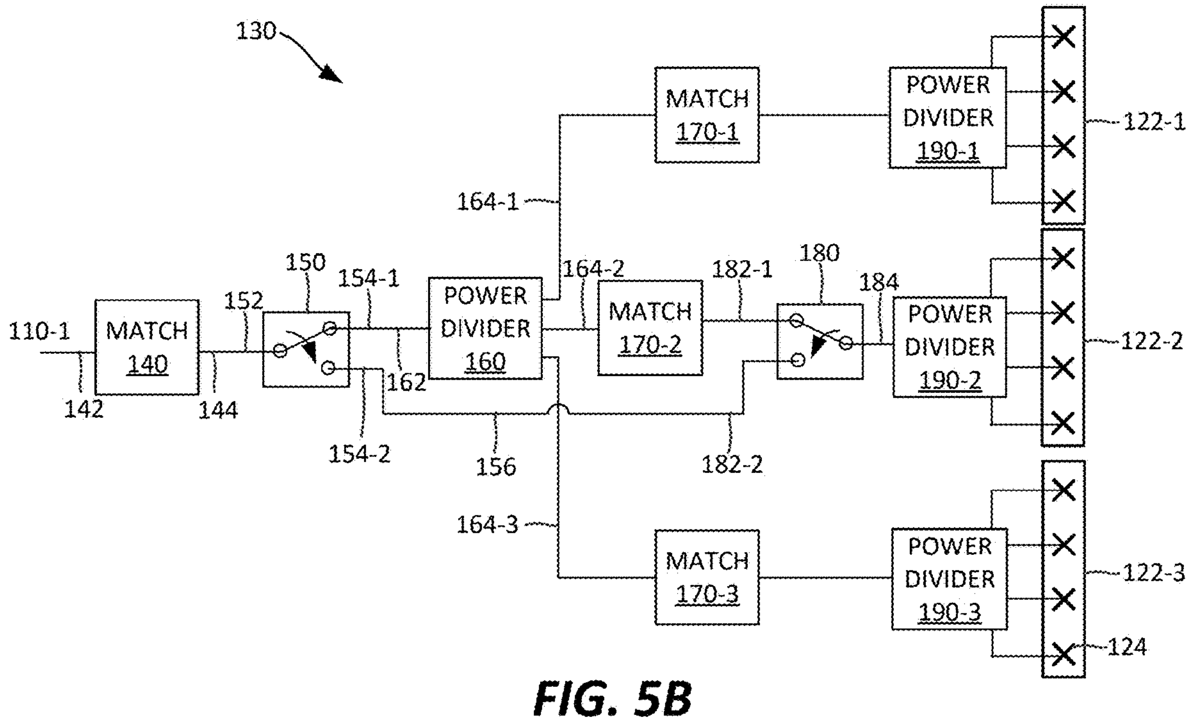
FIG. 5B is a block diagram of a feed network of the antenna of FIG. 5A.

FIGS. 5A and 5B illustrate a switchable antenna according to certain embodiments of the present invention. In particular, FIG. 5A is a schematic front view of the antenna 100 with a radome thereof removed. FIG. 5B is a schematic block diagram of a feed network 130 that is included in antenna 100.

Referring to FIG. 5A, the antenna 100 includes a pair of RF ports 110-1, 110-2. The antenna 100 may include a conventional housing (not shown) such as, for example, a tubular radome with bottom and top end caps, that protects the electronic circuits of antenna 100 from environmental elements. The RF ports 110-1, 110-2 may extend through the housing, and may be used to connect antenna 100 to an external radio via, for example, coaxial cables. A wide variety of RF ports may be used, including threaded connector ports, blind mate ports, push-on connector ports and the like.

As is further shown in FIG. 5A, antenna 100 includes an array 120 of radiating elements 124. The array 120 includes three columns 122-1 through 122-3 of radiating elements 124. The radiating elements 124 extend outwardly from a reflector 112 that may act as a ground plane for the radiating elements 124. The radiating elements 124 may each comprise slant −/+45° cross-dipole radiating elements, although any type of radiating element may be used. Each radiating element 124 may, in an example embodiment, be designed to generate an element radiation pattern having HPBWs of about 45° in both the azimuth and elevation planes. A feed network 130 (FIG. 5B) connects the RF ports 110 to the radiating elements 124 of antenna array 120.

Referring to FIG. 5B, a portion of the feed network 130 for antenna 100 is shown. The feed network 130 connects the RF ports 110-1, 110-2 to the radiating elements 124. As shown in FIG. 5B, RF port 110-1 is coupled to an impedance transformer 140. The impedance transformer 140 may comprise, for example, a transmission line segment and/or a lumped element (e.g., a lumped capacitor-inductor or "LC" circuit) that transform the impedance from a first value at the input 142 thereto (which may be matched to an impedance of the output of the radio, for example) to a second, different impedance at the output 144 thereof. The second impedance may comprise, for example, 50 ohms.

The output 144 of impedance transformer 140 may be coupled to an input 152 of a first 1×2 switch 150. The first 1×2 switch 150 may comprise, for example, a solid state switch such as a field effect transistor, a bipolar junction transistor or a PIN diode, may comprise an electromechanical switch such as a single pole double throw relay, or may comprise a mechanical switch. The first 1×2 switch 150 includes first and second outputs 154-1, 154-2, each of which have an impedance of about 50 ohms. The first output 154-1 of the first 1×2 switch 150 is coupled to an input 162 of a 1×3 power divider 160. The second output 154-2 of the first 1×2 switch 150 is coupled to a second input 192-2 of a second 1×2 switch 180, as will be discussed below. A transmission line segment 156 such as a coaxial cable may be used to connect the second output 154-2 of the first 1×2 switch 150 to the second input 192-2 of the second 1×2 switch 190.

The impedance at the input 162 of the 1×3 power divider 160 is about 50 ohms. The 1×3 power divider 160 includes first through third outputs 164-1, 164-2, 164-3 each of which have an impedance of about 150 ohms due to the power division. The three outputs 164-1 through 164-3 of the 1×3 power divider 160 are coupled to respective first through third impedance transformers 170-1 through 170-3. Each impedance transformer 170 may comprise, for example, a transmission line segment or a lumped element (e.g., a lumped LC circuit) that transform the impedance from a first value (e.g., 150 ohms) at the input to a second, different impedance (e.g., 50 ohms). The output of the first impedance transformer 170-1 is coupled to an input of a first 1×4 power divider 190-1, and the output of the third impedance transformer 170-3 is coupled to an input of a third 1×4 power divider 190-3. The four outputs of 1×4 power divider 190-1 are coupled to the respective −45° dipole radiators of the four radiating elements 124 in column 122-1 of antenna array 120, and the four outputs of 1×4 power divider 190-3 are coupled to the respective −45° dipole radiators of the four radiating elements 124 in column 122-3 of antenna array 120.

The output of impedance transformer 170-2 is coupled to the first input 182-1 of the second 1×2 switch 180. As noted above, the second input 182-2 of the second 1×2 switch 180 is coupled to the second output 154-2 of the first 1×2 switch 150 by transmission line segment 156. The output 184 of the second 1×2 switch 180 is coupled to an input 192 of a second 1×4 power divider 190-2. The four outputs of the second 1×4 power divider 190-2 are coupled to the respective −45° dipole radiators of the four radiating elements 124 in column 122-2 of antenna array 120.

While not shown in FIG. 5B to simplify the drawing, elements 140, 150, 160, 170, 180 and 190 of feed network 130 are duplicated in order to connect RF port 110-2 to the +45° dipole radiators of the radiating elements 124 of antenna array 120 in the exact same fashion.

The antenna 100 may operate as follows. When configured as a high gain antenna, the first and second switches may each be set to their "top" position as is shown in FIG. 5B. An RF signal input to RF port 110-1 may be impedance transformed by impedance transformer 140 to have an impedance that matches the impedance seen at the input 152 of the first 1×2 switch 150. The RF signal is output through the first output 154-1 of the first switch 152 where it is passed to the input 162 of the 1×3 power divider 160. The RF signal input to the power divider 160 may have an impedance of about 50 ohms, and this signal may be divided into three sub-components by the power divider 160, each of which has an impedance of about 150 ohms. Each sub-component of the RF signal is output through a respective one of outputs 164-1 through 164-3 of power divider 160 and passed to respective impedance transformers 170-1 through 170-3, which convert the impedance to an impedance of about 50 ohms. The sub-component of the RF signal output through impedance transformer 170-1 is passed to the input of 1×4 power divider 190-1, which further splits the sub-component four ways, resulting in an impedance transformation to 200 ohms for each sub-component, which matches the 200 ohm input impedance of each radiating element 124. Each output of the 1×4 power divider 190-1 may be connected to a respective one of the −45° dipole radiators of the radiating elements 124 in the first column 122-1 of antenna array 120. Similarly, the sub-component of the RF signal output through impedance transformer 170-3 is passed to the input of 1×4 power divider 190-3, which further splits the sub-component four ways, resulting in an impedance transformation to 200 ohms for each sub-component. Each output of the 1×4 power divider 190-3 may be connected to a respective one of the −45° dipole radiators of the radiating elements 124 in the third column 122-3 of antenna array 120.

The sub-component of the RF signal output through impedance transformer 170-2 is passed to the first input 182 of the second 1×2 switch 180. This signal passes to the output 184 of the second switch 180 where it is passed to the input of 1×4 power divider 190-2, which further splits the sub-component four ways, resulting in an impedance transformation to 200 ohms for each sub-component. Each output of the 1×4 power divider 190-2 may be connected to a respective one of the −45° dipole radiators of the radiating elements 124 in the second column 122-2 of antenna array 120. Thus, the RF signal is sub-divided into three sub-components that are transmitted through three columns 122 of radiating elements 124 to provide a narrow beamwidth, high gain antenna beam.

As can be seen from FIG. 5B, when antenna 100 is operated as a sector antenna that has lower gain, all of the RF energy is fed to the second column 122-2 of radiating elements 124. In this mode, the RF signal will experience a 0.5-1 dB insertion loss in passing through the first RF switch 150 and another 0.5-1 dB insertion loss in passing through the second RF switch 180, for a total insertion loss in the switching network of 1-2 dB. While such a loss is relatively high, the gain of the antenna array 120 when operating in the sector antenna mode (ignoring losses in the feed network) is less important.

When antenna 100 is operated in the high gain mode, the inclusion of the first switch 150 in the feed network 130 results in an insertion loss of about 0.5-1 dB. However, only one of the three sub-components of the RF signal passes through the second switch 180, namely the sub-component that is fed to the second (central) column 122-2 of radiating elements 124. Thus, only about a third of the RF energy is impacted by the insertion loss of the second switch 180 when the antenna 100 operates as a high gain antenna, and hence the total insertion loss may be on the order of about 1 dB when the antenna 100 operates as a high gain antenna. Such a loss is a small penalty to pay for having the ability to select between two different patterns.

As described above, antenna 100 may be switchable between a high gain mode and a lower gain (sector antenna) mode. Antenna 100 includes an RF port 110-1, an antenna array 120 that includes at least first through third columns 122-1, 122-2, 122-3 of radiating elements 124, and a feed network 130 that is coupled between the RF port 110-1 and the antenna array 120. The feed network 130 includes a first switch 150 having an input 152 coupled to the RF input port 110-1, a first output 154-2 that is coupled to each of the columns 122 of radiating elements 124 and a second output 154-2. The feed network 130 further includes a second switch 180 having a first input 182-1 coupled to the first output 154-1 of the first switch 150, a second input 182-2 coupled to the second output 154-2 of the first switch 150, and a first output 184 that is coupled to the second column 122-2 of radiating elements 124. The second column 122-2 of radiating elements 124 is coupled to the RF input port 110-1 via a greater number of switches (here two, namely switches 150, 180) than the first and third columns 122-1, 122-3 of radiating elements 124 (which are each coupled to RF port 110-1 through a single switch 150). The feed network 130 has a first loss when configured to operate in the high gain mode and a second loss when configured to operate in the lower gain mode, where the second loss exceeds the first loss Generally speaking, the shape of the antenna beam in the high gain mode will be the best if the magnitude of the sub-component of the RF signal that is fed to the second column 122-2 is greater than or equal to the magnitudes of the sub-components of the RF signal that are fed to the first through third columns 122-1 and 122-3. If this is not the case, the sidelobes in the antenna pattern tend to increase, which means that the antenna 100 will generate increased interference with other sectors and less RF energy (gain) within the region the antenna 100 is designed to cover. If power divider 160 is an equal power divider, central column 122-2 will receive less power than outer columns 122-1 and 122-3 due to the insertion loss of the second switch 180.

In order to improve the sidelobe performance, in some embodiments of the present invention, various techniques may be used to increase the amount of RF power directed to the center of the coverage area when operating in high gain mode while decreasing the amount directed to either side of the coverage area in order to compensate for the increased insertion loss experienced by the sub-component of the RF signal fed to the central column 122-2 of antenna array 120. One way to achieve this goal is to use an unequal power divider to implement the 1×3 power divider 160. For example, the power divider 160 may be designed to pass 35-50% of the power of an RF signal input thereto to output 164-2, while splitting the remaining power between outputs 164-1 and 164-3. In other embodiments, the power divider 160 may be designed to pass 40-45% of the power of an RF signal input thereto to output 164-2, while splitting the remaining power between outputs 164-1 and 164-3. By increasing the amount of RF power fed to the central column 122-2 it is possible to compensate for the insertion loss added by the second switch 180.

In other embodiments, RF signals emitted by the radiating elements 124 in the first and third columns 122-1, 122-3 may be redirected toward the center of the coverage area. This may be accomplished, for example, by mounted reflectors or directors adjacent the radiating elements 124 in the first and third columns 122-1, 122-3. Reflectors and directors refer to conductive elements that are selectively connected to a ground plane that is associated with a radiating element through an electronic switch such as a PIN diode. Reflectors and directors are used to shape the antenna beam formed by the radiating element. Directors are elements that act to "pull" the RF energy emitted by the radiating element in the direction of the director, thereby increasing the gain of the antenna pattern in the direction of the director (and reducing the gain in other directions). Reflectors are elements that tend to reflect or "push" the RF energy emitted by a radiating element back toward the radiating element, thereby increasing the gain of the antenna pattern generated by the radiating element in a direction opposite of a vector extending between the radiating element and the reflector, and reducing the gain in the direction of the reflector. Reflectors and directors may be implemented as metal objects having any appropriate shape that are placed near an antenna. The reflectors/directors may be used to push or pull RF energy emitted by the first and third columns 122-1, 122-3 toward the center of the sector in order to improve the shape of the antenna beam and to reduce the sidelobe levels. When antenna 100 operates as a sector antenna, the reflectors/directors can be decoupled from the ground plane (by opening the electronic switch of each director/reflector).

Figure 6A:
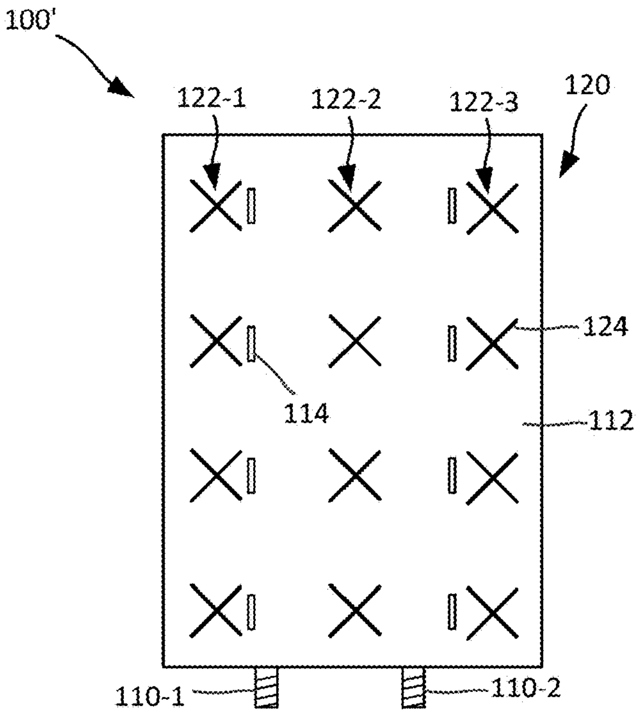
FIG. 6A is a schematic front view of a switchable antenna according to embodiments of the present invention with the radome removed that includes a plurality of directors.

FIG. 6A is a schematic front view of a modified version 100' of switchable antenna 100 that includes a plurality of directors 114. As shown in FIG. 6A, each director 114 may comprise a metallic element that extends forwardly from the ground plane 112 adjacent a radiating element 124. Each director 114 further includes an electronic switch (not shown) that may be used to selectively electrically connect the director 114 to the ground plane 112. The directors 114 for column 122-1 of antenna array 120 are positioned between columns 122-1 and 122-2 so that, when activated, they will direct more of the RF energy emitted by the radiating elements 124 in column 122-1 toward the center of the coverage area for antenna 100'. Similarly, the directors 114 for column 122-3 of antenna array 120 are positioned between columns 122-2 and 122-3 so that, when activated, they will direct more of the RF energy emitted by the radiating elements 124 in column 122-3 toward the center of the coverage area for antenna 100'.

Figure 6B:
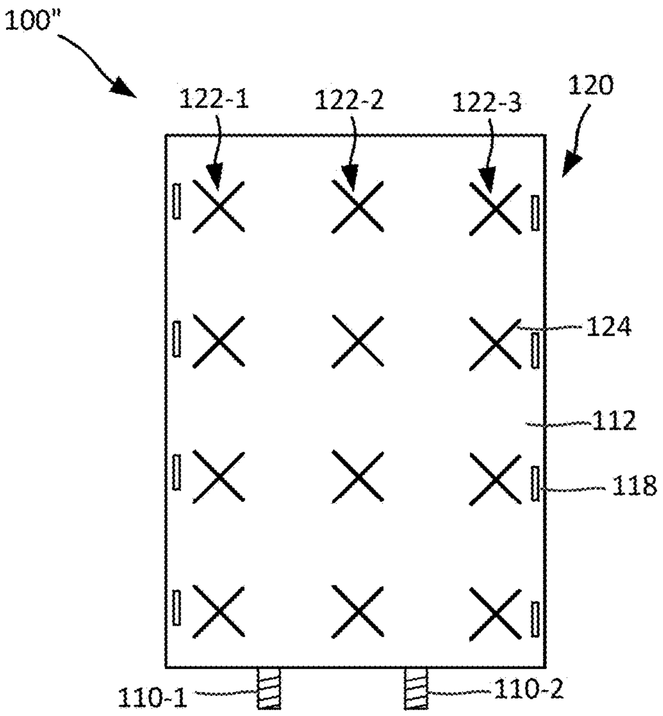
FIG. 6B is a schematic front view of a switchable antenna according to embodiments of the present invention with the radome removed that includes a plurality of reflectors.

FIG. 6B is a schematic front view of another modified version 100" of switchable antenna 100 that includes a plurality of reflectors 118. As shown in FIG. 68, each reflector 118 may comprise a metallic element that extends forwardly from the ground plane 112 adjacent a radiating element 124. Each reflector 118 further includes an electronic switch (not shown) that may be used to selectively electrically connect the reflector 118 to the ground plane 112. The reflectors 118 for column 122-1 of antenna array 120 are positioned on the left side of columns 122-1 so that, when activated, they will direct more of the RF energy emitted by the radiating elements 124 in column 122-1 toward the center of the coverage area for antenna 100". Similarly, the reflectors 118 for column 122-3 of antenna array 120 are positioned to the right of column 122-3 so that, when activated, they will direct more of the RF energy emitted by the radiating elements 124 in column 122-3 toward the center of the coverage area for antenna 100".

In still other embodiments, power may be reactively reflected away from the feed paths for the first and third columns 122-1, 122-3 of radiating elements 124 and into the feed path for the second column 122-2 of radiating elements 124 using mismatching in the feed network 130. This can be accomplished, for example, by creating an impedance mismatch having an imaginary component of positive X along the feed path to one of the first and third columns 122-1, 122-3 of radiating elements 124 and by creating an impedance mismatch having an imaginary component of negative X along the feed path to the other of the first and third columns 122-1, 122-3 of radiating elements 124. For example, in feed network 130 of FIG. 5B, impedance transformer 170-1 may be designed to have an output impedance of 50 ohms+jX and impedance transformer 170-3 may be designed to have an output impedance of 50 ohms−jX. Since these two paths are disposed in parallel they resonate and act to send more of the RF energy to the central column 122-2 of radiating elements 124. In other words, the impedance mismatch may be designed so that 1×3 power divider 160 will act as an unequal power divider. Using reactive reflection techniques conserves RF power and provides an easy way to adjust the power ratio the sub-components of the RF signal that are fed to the first and third columns 122-1, 122-3 with respect to the power fed to the second column 122-2 in order to provide a well-behaved antenna pattern. Preferably, the first and third columns 122-1, 122-3 are fed with uniform power to provide a symmetrical antenna beam. When the three columns 122-1 through 122-3 are fed with equal power, the first sidelobes may be about 13 dB below the main lobe of the antenna beam. If greater attenuation of the sidelobes is desired, the central column 122-2 may be fed with more RF power than the first and third columns 122-1, 122-3, albeit at some loss of aperture efficiency and minimum gain within the sector.

Antenna 100 may be designed so that it may be set in either the factory or in the field to operate in either the high gain mode or the lower gain mode. For example, in some embodiments, the positions of switches 150, 180 may be set in the factory. In other embodiments, antenna 100 may include a switch or other mechanism that a technician can set in order to set the positions of switches 150, 180. In still other cases, antenna 100 may be designed so that control signals may be transmitted to antenna 100 from a remote location that cause the antenna to set switches 150, 180 to desired positions. As can be seen from FIG. 5B, each column of radiating elements 122 is impedance matched to the RF input port 110-1 whether the antenna 100 operates in the high gain or lower gain modes.

In certain deployment scenarios, particularly in an outdoor setting where the area to be covered by WiFi service is large, panel antennas with gain are utilized. There are basically two desired pattern shapes that address outdoor coverage, a sector antenna with a fan shaped beam in azimuth to cover a wide swath of area and a narrow beam antenna which focusses its energy in a small spot for maximum gain on-axis to cover large distances. As described above, switchable antenna 100 may generate either of these two patterns, and may exhibit reduced switching losses when operated in the high gain mode since only about one third of the RF energy passes through two RF switches.

Figure 7A:
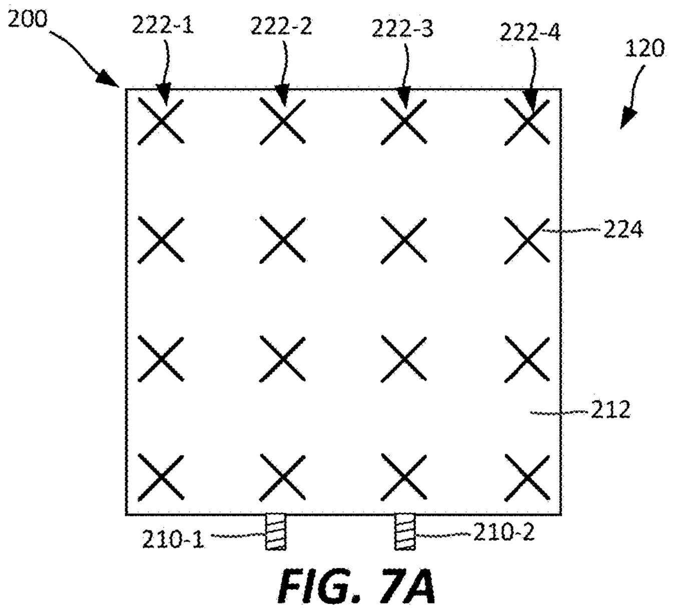
FIG. 7A is a schematic front view of a switchable antenna according to further embodiments of the present invention with the radome thereof removed.

FIG. 7A is a schematic front view of a switchable antenna 200 according to further embodiments of the present invention with the housing thereof removed. As shown in FIG. 7A, the antenna 200 includes a pair of RF ports 210-1, 210-2. RF ports 210-1, 210-2 may be identical to RF ports 110-1, 110-2, and hence further description thereof will be omitted. Antenna 200 also includes an array 220 of radiating elements 224. Antenna array 220 includes four columns 222-1 through 222-4 of radiating elements 224 that extend outwardly from a reflector 212 that may act as a ground plane for the radiating elements 224. The radiating elements 224 may be identical to radiating elements 124, and hence further description thereof will be omitted. A feed network 230 (FIG. 7B) connects the RF ports 210 to the radiating elements 224.

Figure 7B:
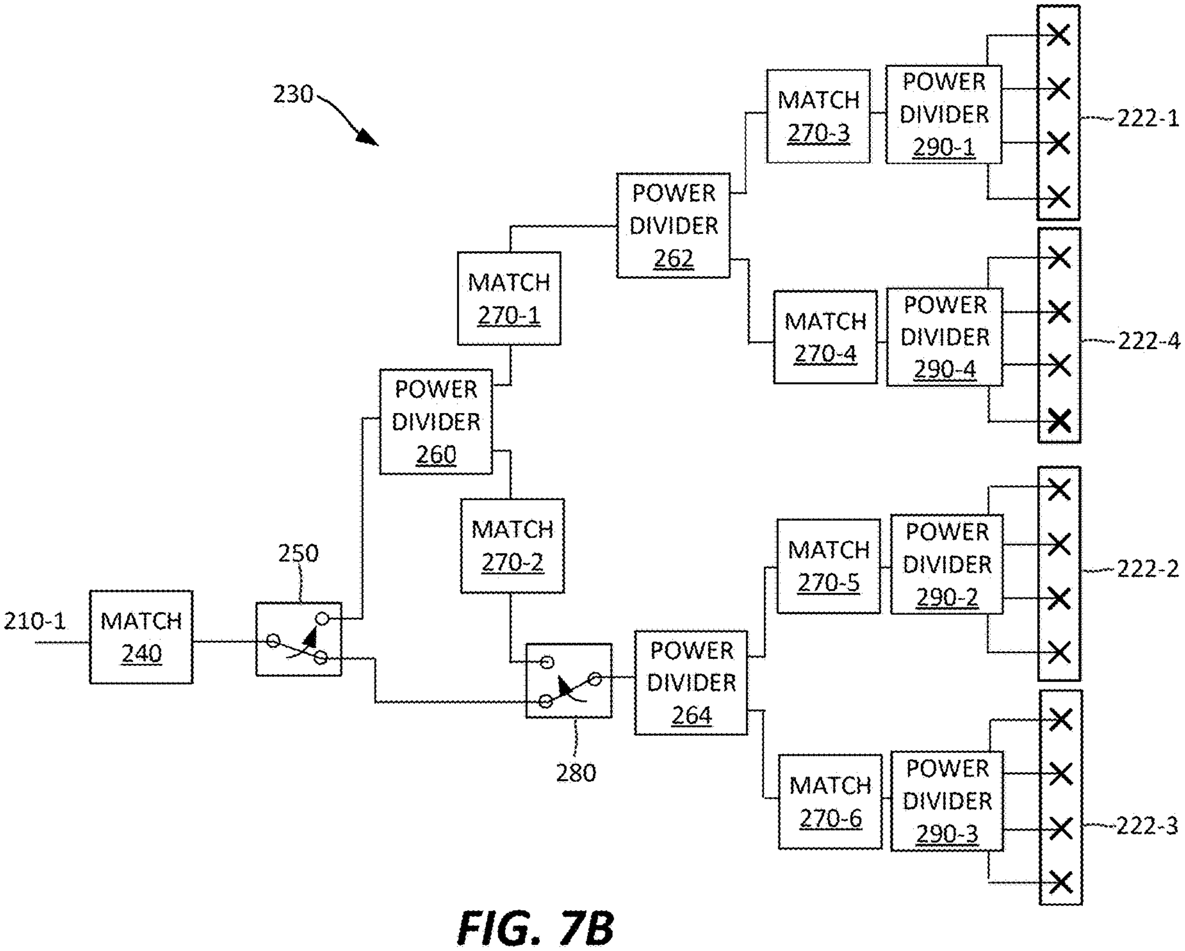
FIG. 7B is a block diagram of a feed network of the antenna of FIG. 6A.

FIG. 7B is a block diagram of the portion of feed network 230 of antenna 200 of FIG. 7A that connects the first polarization RF port 210-1 to the antenna array 220. As shown in FIG. 7B, RF port 210-1 is coupled to an impedance transformer 240, which may be identical to impedance transformer 140 of FIG. 5B. The output of impedance transformer 240 is coupled to an input of a first 1×2 switch 250, which may be identical to switch 150 of FIG. 5B. The first output of switch 250 is coupled to an input of a 1×2 power divider 260. The second output of the switch 250 is coupled to a second input of a second 1×2 switch 280, as will be discussed below. A transmission line such as a coaxial cable may be used to connect the second output of switch 250 to the second input of the switch 280.

The two outputs of power divider 260 are coupled to respective impedance transformers 270-1 and 270-2, which may each be identical to impedance transformers 170 of FIG. 5B. The output of impedance transformer 270-1 is coupled to 1×2 power divider 262. The outputs of power divider 262 are coupled to respective impedance transformers 270-3, 270-4, which in turn are connected to respective 1×4 power dividers 290-1, 290-4. The four outputs of 1×4 power divider 290-1 are coupled to the respective −45° dipole radiators of the four radiating elements 224 in columns 222-1 and 222-4 of antenna array 220.

The output of impedance transformer 270-2 is coupled to a first input of 1×2 switch 280. The output of switch 280 is coupled to 1×2 power divider 264. The outputs of power divider 264 are coupled to respective impedance transformers 270-5, 270-5, which in turn are connected to respective 1×4 power dividers 290-2, 290-3. The four outputs of 1×4 power divider 290-2 are coupled to the respective −45° dipole radiators of the four radiating elements 224 in columns 222-2 and 222-3 of antenna array 220.

While not shown in FIG. 7B to simplify the drawing, elements 240, 250, 260, 262, 264, 270, 280 and 290 of feed network 230 are duplicated in order to connect RF port 210-2 to the +45° dipole radiators of the radiating elements 224 of antenna array 220 in the exact same fashion.

The antenna 200 may operate similarly to antenna 100. When configured as a sector antenna, the first and second switches may each be set to their “bottom” position as is shown in FIG. 7B. This will result in all the energy of an RF signal that is input to RF port 210-1 being output through the −45° dipole radiators of the radiating elements 224 in the second and third (central) columns 222-2, 222-3 of antenna array 220. When antenna 200 is operated as a high gain antenna, feed network 230 will split RF signals input at RF port 210-1 into four sub-components (e.g., 25% of the energy in each sub-component) that are fed to the four respective columns 122-1 through 122-4 of antenna array 220 to generate a high gain antenna beam. Notably, only two of the sub-components of the RF signal will pass through both switches 250 and 280, hence limiting the amount of insertion loss when the antenna 200 operates as a high gain antenna.

It will be appreciated that many modifications may be made to the antennas described above without departing from the scope of the present invention. For example, the antennas can have more or fewer columns of radiating elements, and can include more or fewer radiating elements in each column. The antennas can be designed to cover different sized coverage areas in the azimuth plane. For example, in some embodiments, the antennas may be designed to cover 120° sectors in the azimuth plane when operating as a sector antenna.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A switchable antenna, comprising:

a radio frequency ("RF") port;

an antenna array that includes at least a first column of radiating elements, a second column of radiating elements and a third column of radiating elements; and a feed network coupled between the RF port and the antenna array, the feed network comprising:

a first switch having a first output that is coupled to each of the columns of radiating elements and a second output; and a second switch having a first input coupled to the first output of the first switch and a second input coupled to the second output of the first switch, and a first output coupled to the second column of radiating elements.

2. The switchable antenna of claim 1, wherein the feed network further comprises a power divider that has an input that is coupled to the first output of the first switch, the power divider including at least a first output that is coupled to the first column of radiating elements, a second output that is coupled to the second column of radiating elements via the second switch, and a third output that is coupled to the third column of radiating elements.

3. The switchable antenna of claim 2, wherein the second column of radiating elements is in between the first column of radiating elements and the third column of radiating elements.

4. The switchable antenna of claim 3, wherein the antenna array includes a total of three columns of radiating elements, and wherein the power divider comprises a 1×3 power divider.

5. The switchable antenna of claim 4, further comprising a first impedance mismatch coupled to the first output of the power divider and a second impedance mismatch coupled to the third output of the power divider, wherein the first and second impedance mismatches have equal but opposite imaginary components.

6. The switchable antenna of claim 2, wherein the second output of the first switch is coupled to the second input of the second switch via a coaxial cable.

7. A switchable antenna that is switchable between a high gain mode and a lower gain mode, comprising:

a radio frequency ("RF") input port;

an antenna array that includes at least a first column of radiating elements, a second column of radiating elements and a third column of radiating elements;

a first switch having an input coupled to the RF input port; and a second switch having an output coupled to the second column of radiating elements, wherein the second column of radiating elements is coupled to the RF input port via a greater number of switches than the first and third columns of radiating elements, wherein a power divider is interposed between a first output of the first switch and the second switch.

8. The switchable antenna of claim 7, wherein the first output of the first switch and a second output of the first switch are coupled to the second column of radiating elements through the second switch.

9. The switchable antenna of claim 7, wherein the power divider includes at least first through third outputs, and the first output of the power divider is coupled to the first column of radiating elements, the third output of the power divider is coupled to the third column of radiating elements, and the second output of the power divider is coupled to the second column of radiating elements through the second switch.

10. The switchable antenna of claim 9, wherein the second output of the power divider is coupled to a first input of the second switch and the second output of the first switch is coupled to a second input of the second switch.

11. The switchable antenna of claim 10, wherein the second column of radiating elements is positioned in between the first column of radiating elements and the third column of radiating elements.

12. The switchable antenna of claim 11, wherein the antenna array includes a total of three columns of radiating elements, and wherein the power divider comprises a 1×3 power divider.

13. The switchable antenna of claim 12, wherein the 1×3 power divider comprises an unequal power divider.

14. The switchable antenna of claim 11, wherein pattern shaping elements are positioned adjacent at least some of the radiating elements in both the first column of radiating elements and the third column of radiating elements, the pattern shaping elements configured to increase the amount of RF energy emitted by both the first column of radiating elements and the third column of radiating elements toward a center of a coverage area for the antenna array.

15. A switchable antenna that is switchable between a high gain mode and a lower gain mode, comprising:

a radio frequency ("RF") input port;

an antenna array that includes at least a first column of radiating elements, a second column of radiating elements and a third column of radiating elements; and a feed network that includes a plurality of switches, where the feed network experiences a first amount of switching loss when the antenna is configured to operate in the high gain mode and a second amount of switching loss when the antenna is configured to operate in the lower gain mode, where the second loss exceeds the first loss, and wherein in the higher gain mode, the antenna array provides a first gain, and in the lower gain mode, the antenna array provides a second gain that is less than the first gain.

16. The switchable antenna of claim 15, wherein the feed network includes a first switch having an input coupled to the RF input port and a second switch having an output coupled to the second column of radiating elements, wherein the second column of radiating elements is coupled to the RF input port via both the first and second switches while the first and third columns of radiating elements are each coupled to the RF input port via only the first switch.

17. The switchable antenna of claim 16, wherein a first output and a second output of the first switch are coupled to the second column of radiating elements through the second switch.

18. The switchable antenna of claim 17, wherein a power divider is interposed between the first output of the first switch and the second switch.

19. The switchable antenna of claim 18, wherein the power divider includes at least first through third outputs, and the first output of the power divider is coupled to the first column of radiating elements, the third output of the power divider is coupled to the third column of radiating elements, and the second output of the power divider is coupled to the second column of radiating elements through the second switch.

* * * * *